United States Patent
Bawa et al.

(10) Patent No.: US 10,841,383 B2
(45) Date of Patent: Nov. 17, 2020

(54) PROVIDING DEVICE SPECIFIC SECURITY MEASURES IN THE INTERNET OF THINGS

(71) Applicant: International Business Machines Corporation, Armonk, NY (US)

(72) Inventors: Harimohan Singh Bawa, Powell, OH (US); Bouna Sall, Severna Park, MD (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 144 days.

(21) Appl. No.: 16/140,166

(22) Filed: Sep. 24, 2018

(65) Prior Publication Data
US 2020/0099749 A1    Mar. 26, 2020

(51) Int. Cl.
| | |
|---|---|
| H04L 29/08 | (2006.01) |
| H04L 12/26 | (2006.01) |
| G06F 9/54 | (2006.01) |
| H04L 29/06 | (2006.01) |
| H04W 4/70 | (2018.01) |

(52) U.S. Cl.
CPC ............ *H04L 67/125* (2013.01); *G06F 9/542* (2013.01); *H04L 43/0817* (2013.01); *H04L 63/10* (2013.01); *H04W 4/70* (2018.02)

(58) Field of Classification Search
CPC ... H04L 67/125; H04L 43/0817; H04L 63/10; H04W 4/70; G06F 9/542
See application file for complete search history.

(56) References Cited

U.S. PATENT DOCUMENTS

| | | | | |
|---|---|---|---|---|
| 6,959,329 | B2* | 10/2005 | Thakor | H04L 41/082 |
| | | | | 709/220 |
| 10,050,978 | B2* | 8/2018 | Morton | H04L 63/20 |
| 2016/0205102 | A1 | 7/2016 | Perretta et al. | |
| 2017/0206034 | A1 | 7/2017 | Fetik | |
| 2019/0387011 | A1* | 12/2019 | Du | G06N 20/00 |
| 2020/0021994 | A1* | 1/2020 | Ranjbar | H04W 12/1204 |

(Continued)

OTHER PUBLICATIONS

Stanislav et al., "Hacking iot: A case study on baby monitor exposures and vulnerabilities." Rapid7 Research, Tech. Report (2015). (Related).

(Continued)

*Primary Examiner* — Todd L Barker
(74) *Attorney, Agent, or Firm* — Garg Law Firm, PLLC; Rakesh Garg; Michael O'Keefe

(57) ABSTRACT

A method for providing device specific security measures in an Internet of Things (IoT) environment includes analyzing a first set of commands received at an IoT device (device) for an unauthorized attempt to gain access to the device. The embodiment further includes in the method generating, for the device, a first device specific code, the first device specific code corresponding to a first set of command options to be performed by the device. The embodiment further includes in the method generating, for the device, a first action map, the first action map corresponding to a first flowchart of steps to be performed upon selection of at least one of the command options. The embodiment further includes in the method transmitting, to the device, the first device specific code and the first action map.

20 Claims, 8 Drawing Sheets

(56) References Cited

U.S. PATENT DOCUMENTS

2020/0028821 A1* 1/2020 Weisshaupt ........... H04L 67/025
2020/0106743 A1* 4/2020 Park ..................... H04L 63/308

OTHER PUBLICATIONS

Miessler, "IoT Attack Surface Mapping." URL: https://www.owasp.org/images/3/36/IoTTestingMethodology.pdf at DEFCON 23 (2015). (Related).
Stead, "A Toaster for Life: using design fiction to facilitate discussion on the creation of a sustainable Internet of Things." Design Research Society 50th Anniversary Conference, Jun. 27-30, 2016 Brighton, UK 3049-3068 Backgroud).
Saichaitanya et al., "Recent trends in IoT." International Journal of Electrical and Electronics Engineering 8.2 (2016). (Related).
Sawicki, "The Internet of things." World Scientific News 48 (2016): 89-96. (Related).

* cited by examiner

US 10,841,383 B2

PROVIDING DEVICE SPECIFIC SECURITY MEASURES IN THE INTERNET OF THINGS

TECHNICAL FIELD

The present invention relates generally to a method, system, and computer program product for providing security measures for devices. More particularly, the present invention relates to a method, system, and computer program product for providing device specific security measures in an IoT environment.

BACKGROUND

Internet of Things (IoT) is essentially a network of a variety of devices, which through embedded sensors, other hardware, and software are able to communicate with each other over a data communication infrastructure according to a standard or specification. It is contemplated within IoT that devices such as refrigerators, thermostats, lighting appliances, vending machines, access-control devices, peripherals, and many other devices in everyday use (collectively referred to hereinafter as "device" or "devices"), will be able to communicate and interoperate with each other using such an infrastructure.

Each device in the IoT implements the necessary components to interoperate on the specified IoT infrastructure. It is very likely, and perhaps even desirable that many devices be available in the IoT to offer the same or similar services, or to offer a particular use to a user. Devices providing the same or similar services often share common programming.

SUMMARY

The illustrative embodiments provide a method, system, and computer program product for providing device specific security measures in an IoT environment. An embodiment includes a method for providing device specific security measures in an Internet of Things (IoT) environment includes analyzing a first set of commands received at an IoT device (device) for an unauthorized attempt to gain access to the device. The embodiment further includes in the method generating, for the device, a first device specific code, the first device specific code corresponding to a first set of command options to be performed by the device. The embodiment further includes in the method generating, for the device, a first action map, the first action map corresponding to a first flowchart of steps to be performed upon selection of at least one of the command options. The embodiment further includes in the method transmitting, to the device, the first device specific code and the first action map.

An embodiment compares the first set of commands received at the device to the first set of command options of the first device specific code.

An embodiment analyzes, at the device, a second set of commands received at the device for an unauthorized attempt to gain access to the device. The embodiment compares the second set of commands received at the device to the first set of command options of the first device specific code.

An embodiment generates, for the device, a second device specific code, the second device specific code corresponding to a second set of command options to be performed by the device.

An embodiment generates, for the device, a second action map corresponding to a second flowchart of steps to be performed upon selection of at least one of the command options of the second set of command options of the second device specific code.

An embodiment transmits, after analyzing the first set of commands received at the device, a security alert in response to the analysis.

An embodiment switches, after analyzing the second set of commands received at the device, the device to a manual mode operation, wherein the manual mode operation restricts internet access for the device.

An embodiment generates, based on the analysis of the second set of commands, a second device specific code, the second device specific code corresponding to a second set of command options to be performed by the device. The embodiment generates, based on the analysis of the second set of commands, a second action map corresponding to a second flowchart of steps to be performed upon selection of at least one of the command options of the second set of command options of the second device specific code. The embodiment enables, after generating the second device specific code and the second action map, internet access for the device.

An embodiment requests, after generating the first device specific code and the first action map, a set of security policies for the device.

In an embodiment, the method is embodied in a computer program product comprising one or more computer-readable storage devices and computer-readable program instructions which are stored on the one or more computer-readable tangible storage devices and executed by one or more processors.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
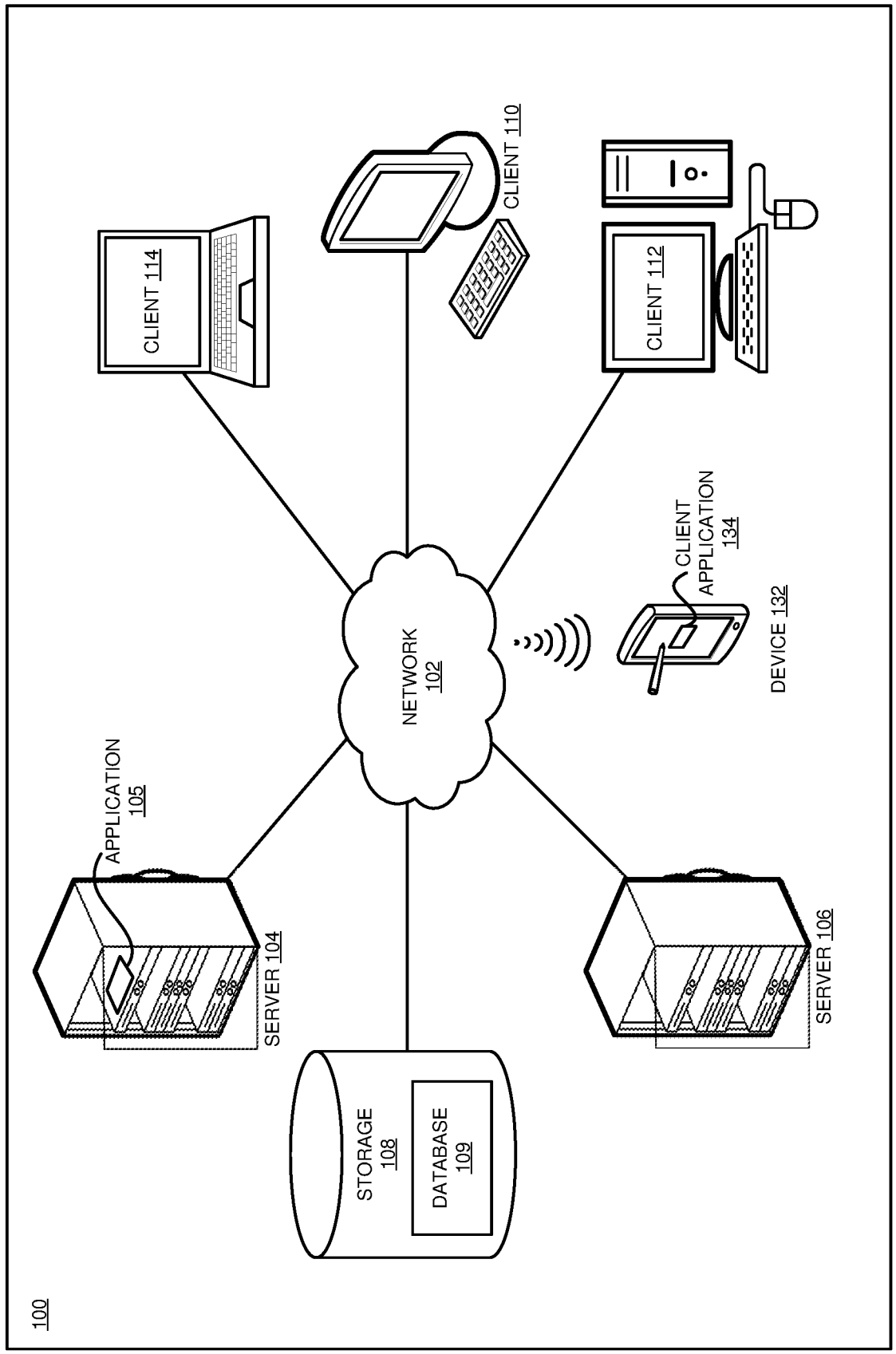
FIG. 1 depicts a block diagram of a network of data processing systems in which illustrative embodiments may be implemented.

The example devices and IoT infrastructures used or described herein are not intended to be limiting on the illustrative embodiments. From this disclosure, those of ordinary skill in the art will be able to adapt an embodiment for use with other types of IoT devices, in other types of IoT environments or infrastructures, and the same are contemplated within the scope of the illustrative embodiments.

Generally, within the scope of the illustrative embodiments, a reference to an IoT device includes resources, facilities, tools, appliance, and other systems, which either include an embedded IoT device, or are otherwise configured to operate as an IoT device. For example, a vending machine may include an IoT device within the machine, a refrigerator's processing module may be configured to operate in a given IoT infrastructure, sanitary facilities at an airport may have embedded IoT devices therein, a cash-register's processing module may be configured to operate on an IoT infrastructure, and the like. Such adaptations, other IoT devices, and other IoT environments are contemplated within the scope of the illustrative embodiments.

The illustrative embodiments recognize that as a result of common programming, a hacker gaining access to a single device can apply the same technique to gain access to same or similar devices within the network. For example, a hacker gains access to an IoT device, gets command codes, and executes commands remotely. For example, a hacker may gain access to an IoT device such as a vending machine. The hacker may gain access to the vending machine to retrieve credit card data from users. The hacker may then apply the same process to gain access to other vending machines to retrieve additional credit card data or another similar purpose. The illustrative embodiments recognize that the same technique the hacker used to gain access to the IoT device can also be used on similar devices within the IoT environment.

The illustrative embodiments used to describe the invention generally address and solve the above-described problems and other problems related to security of IoT devices within an IoT environment. The illustrative embodiments provide a method, system, and computer program product for providing device specific security measures in an IoT environment.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description.

The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
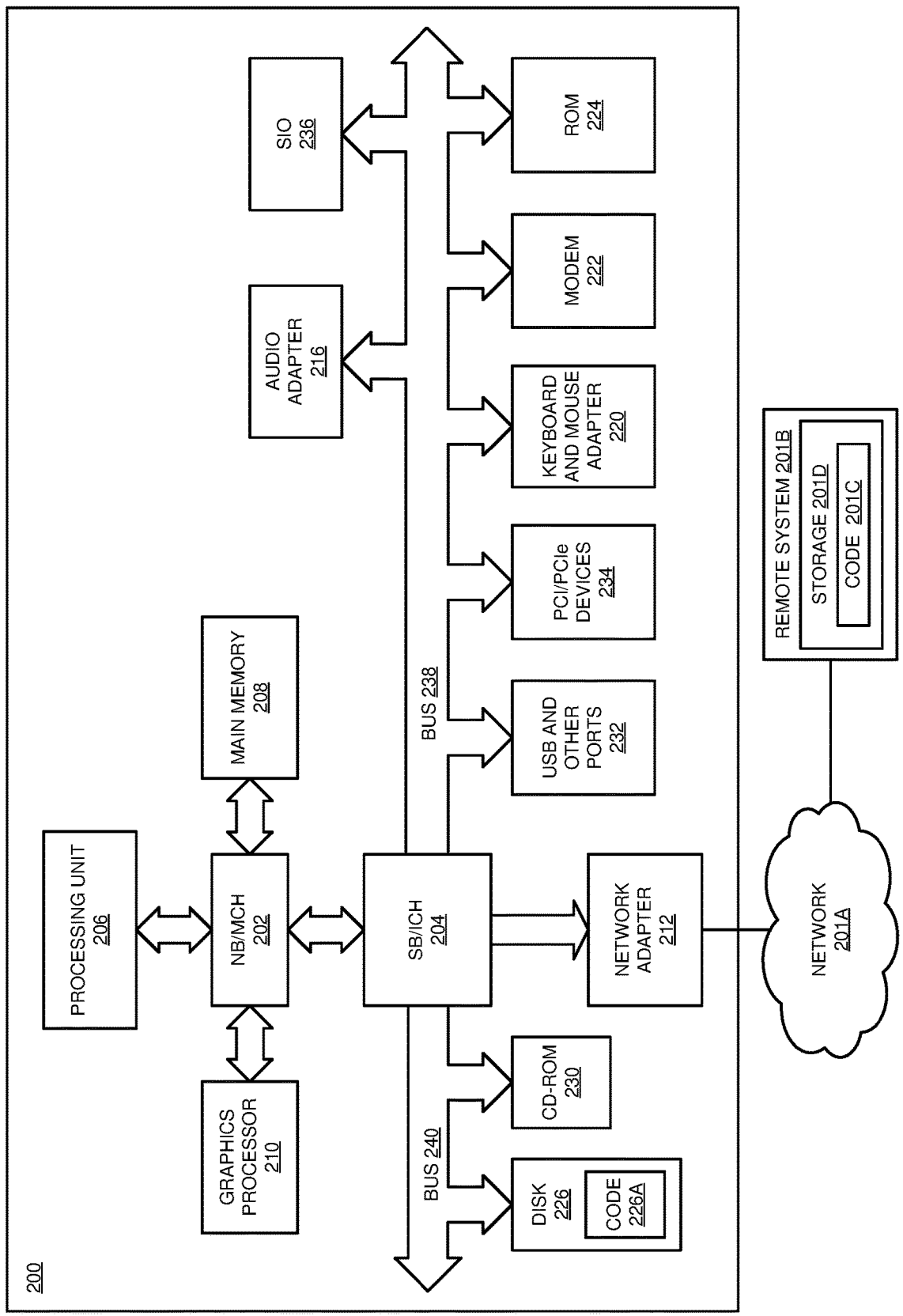
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Devices 132, 136 is an example of a device described herein. For example, devices 132, 136 can take the form of a smartphone, a tablet computer, a laptop computer, client 110 in a stationary or a portable form, a wearable computing device, or any other suitable device. Any software application described as executing in another data processing system in FIG. 1 can be configured to execute in devices 132, 136 in a similar manner. Any data or information stored or produced in another data processing system in FIG. 1 can be configured to be stored or produced in device 132, 136 in a similar manner.

Application 105 implements an embodiment described herein. Application 105 implements a remotely usable function (remote) of an embodiment described herein. Applications 134, 138 implement a locally usable function (local) or a natively usable function (native) of an embodiment described herein. Applications 105, 134, 138 can be used in a combination to distribute certain functions of an embodiment. Application 105 performs user registration, device registration, device specific code generation, action map generation, security policy retrieval, security alerts, other operations described herein, or some combination thereof.

Applications 134, 138 are usable by a user to perform a self-healing process. Applications 134, 138 transmit to application 105 information about commands received at the corresponding devices 132, 136, recognize hack attempts on the corresponding devices 132, 136, send security alerts to server 104 executing application 105, switch the corresponding devices 132, 136 to manual mode to restrict access to the internet until the self-healing process is completed, request updated device specific codes, request updated action maps, request updated security policies, other operations described herein, or some combination thereof. Applications 134, 138 may perform this function autonomously or upon activation by application 105.

Servers 104 and 106, storage unit 108, and clients 110, 112, and 114, and devices 132, 136 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as devices 132, 136 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro- SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
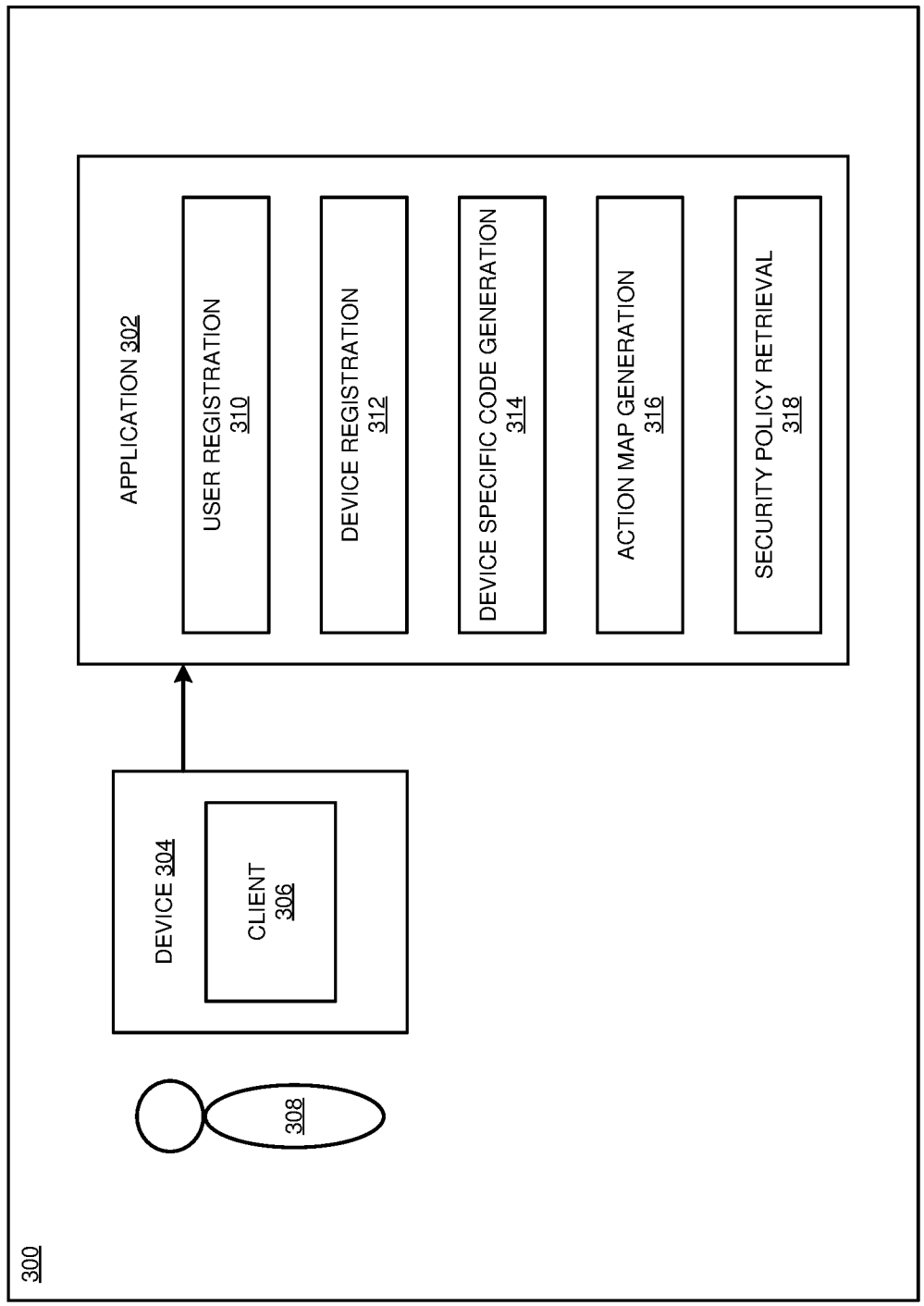
FIG. 3 depicts a block diagram of an example configuration for user and device registration of an IoT device in an IoT environment.

With reference to FIG. 3, this figure depicts a block diagram of an example configuration 300 for user and device registration of an IoT device in an IoT environment. The example embodiment includes an application 302. In a particular embodiment, application 302 is an example of application 105 of FIG. 1.

Device 304 is an example of device 132 in FIG. 1 and executes client 306. Client 306 is an example of application 134 in FIG. 1. User 308 uses client 306 to request user and device registration with the IoT environment. Client 306 transmits request, which includes a set of device information and a set of user information. Request may be directed to application 302, detected by application 302, intercepted by application 302, or redirected to application 302.

Component 310 extracts user information from request. Component 310 transmits the extracted user information for storage, such as storage in database 109. Component 312 extracts device information from request. Component 312 transmits the extracted device information for storage, such as storage in database 109.

Component 314 generates a device specific code for use of the device 304 in the IoT environment. For example, the device specific code may provide command options to be performed by the device 304. Component 316 generates an action map for the device 304. For example, the action map may provide a flowchart of steps to be performed upon selecting at least one of the command options. Component 318 requests a security policy for the device 304. For example, the request is transmitted to an IoT security manager in communication with server 104.

Figure 4:
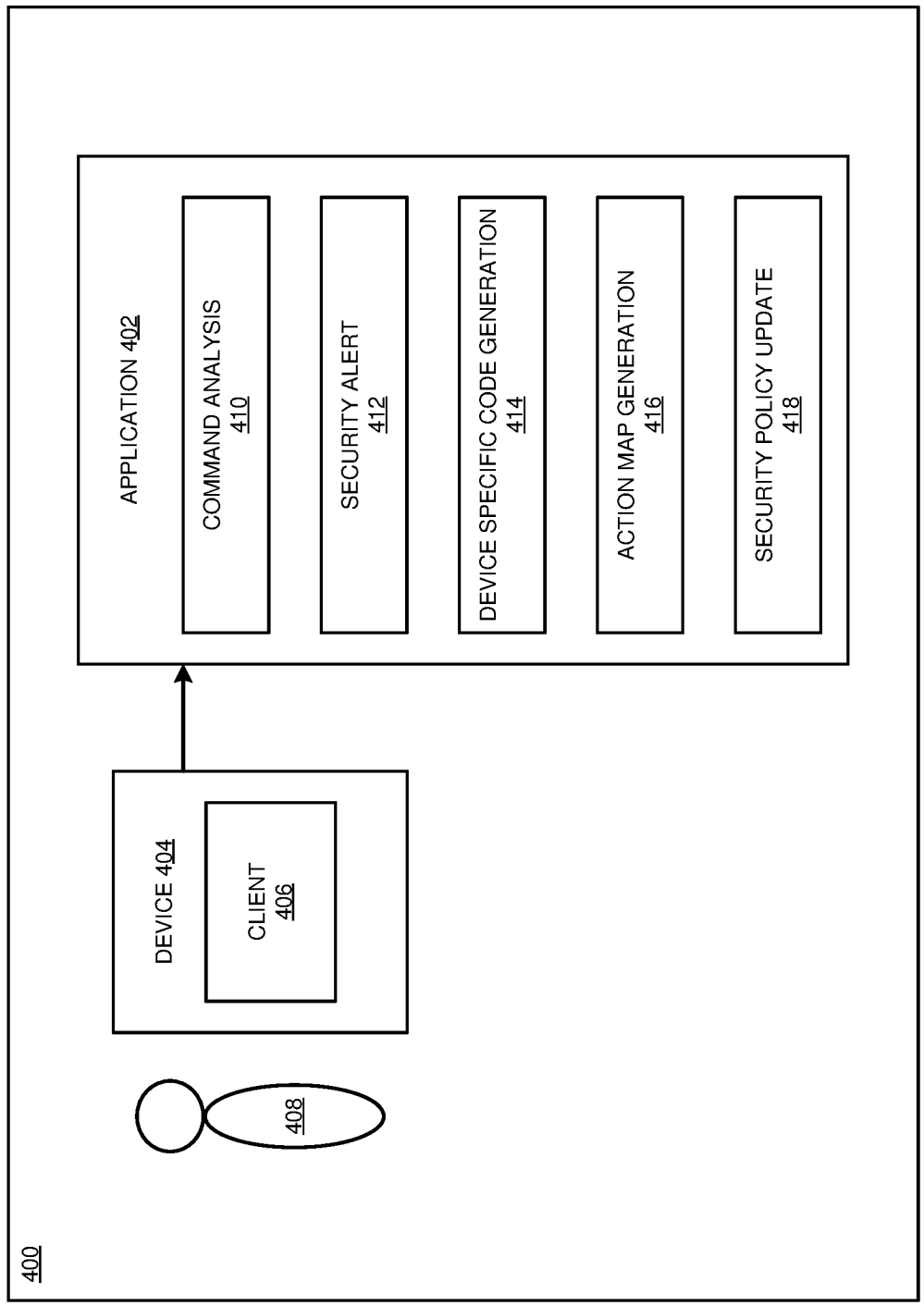
FIG. 4 depicts a block diagram of an example configuration for updating device security.

With reference to FIG. 4, this figure depicts a block diagram of an example configuration 400 for updating device security. The example embodiment includes an application 402. Application 402 describes operations in addition to the operations of application 302 in FIG. 3. The operations of application 302 and application 402 can be implemented together as application 105 or distributed in separate applications within the scope of the illustrative embodiments. In a particular embodiment, application 402 is an example of application 105 of FIG. 1.

Device 404 is an example of device 132 in FIG. 1 and executes client 406. Client 406 is an example of application 134 in FIG. 1. User 408 uses client 406 to transmit information about commands received at the device 404. For example, device 404 may receive commands which do not correspond to any function capable of performance by the device 404. For example, the device 404 may be a printer and receive a command requesting available financial information, such as credit card data. Client 406 transmits information, which includes information about commands received at the device 404. Information may be directed to application 402, detected by application 402, intercepted by application 402, or redirected to application 402.

Component 410 analyzes commands received at a device. For example, the device may receive commands which do not correspond to any function capable of performance by the device. For example, the device may be a printer and receive a command requesting available financial information, such as credit card data. In an embodiment, component 410 compares the received commands to the set of command options of the device specific code. In an embodiment, component 410 determines an unauthorized attempt to access the device occurred based on the analysis. For example, component 410 determines an unauthorized attempt to access the device occurred if the received commands do not match any of the set of command options of the device specific code. In another embodiment, component 410 determines an unauthorized attempt to access the device occurred if the same command is received at the device a predetermined number of times.

Component 412 transmits a security alert in response to receiving information. For example, component 410 transmits a security alert to the client 406, informing the user an unauthorized attempt to access the device 404 may have occurred. In an embodiment, component 410 also transmits a security alert and information to an IoT security manager in communication with server 104. The IoT security manager performs data analysis on the information to determine if an unauthorized attempt to access the device 404 may have occurred.

Component 414 generates a new device specific code for use of the device 404 in the IoT environment. For example, the device specific code may provide command options to be performed by the device 404. Component 416 generates a new action map for the device 404. For example, the action map may provide a flowchart of steps to be performed upon selecting at least one of the command options. Component 418 requests a security policy update for the device 404. For example, the request is transmitted to the IoT security manager in communication with server 104.

Figure 5:
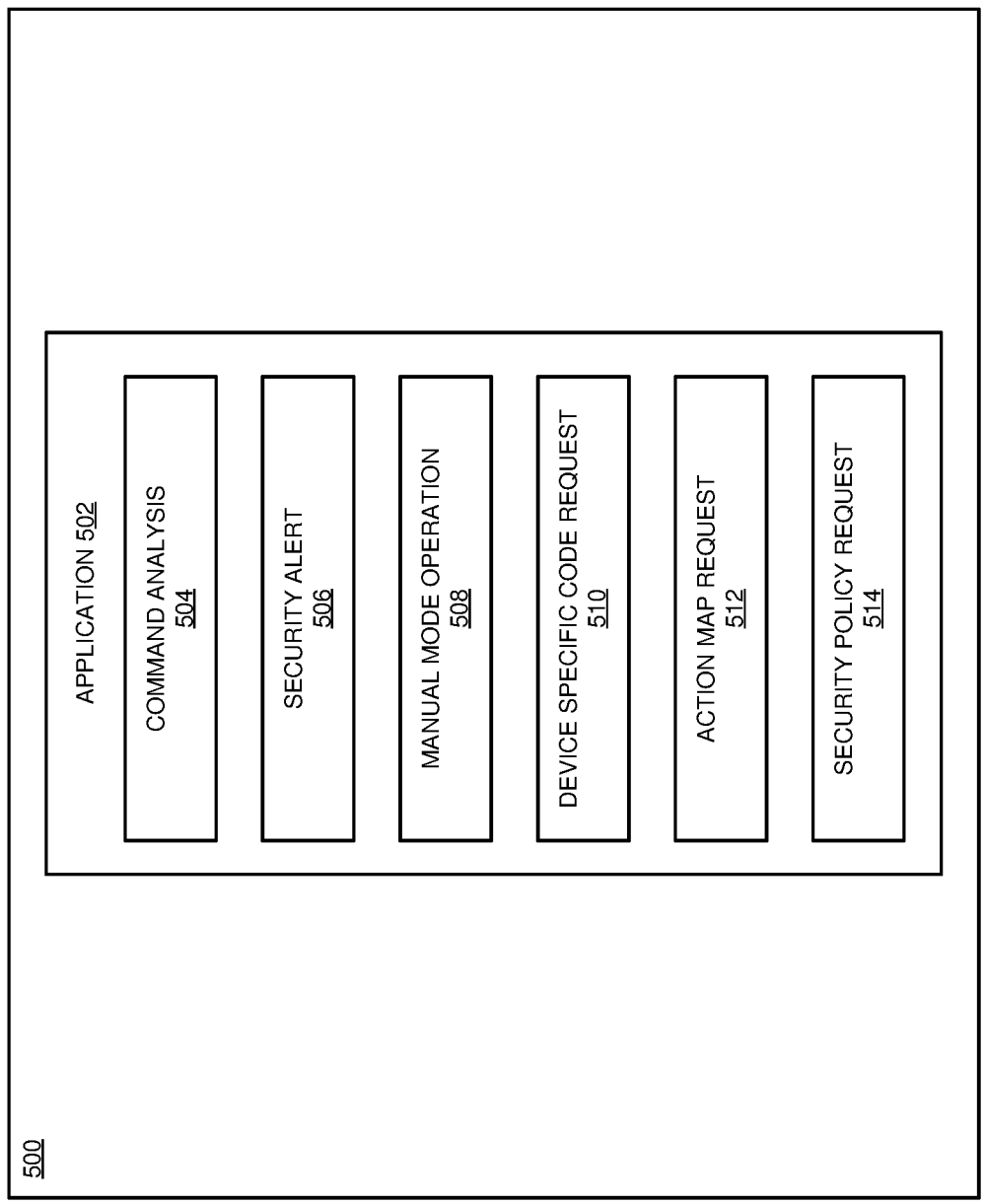
FIG. 5 depicts a block diagram of an example configuration for updating device security in response to an event.

With reference to FIG. 5, this figure depicts a block diagram of an example configuration 500 for updating device security in response to an event. The example embodiment includes an application 502. Application 502 described operations in addition to the operations of application 402 in FIG. 4 and the operations of application 302 in FIG. 3. The operations of application 302, application 402, and application 502 can be implemented together as application 105 or distributed in separate applications within the scope of the illustrative embodiments. In a particular embodiment, application 502 is an example of application 134 of FIG. 1.

Application 502 is an example of application 134 in FIG. 1. Component 504 analyzes commands received at a device. For example, the device may receive commands which do not correspond to any function capable of performance by the device. For example, the device may be a printer and receive a command requesting available financial information, such as credit card data. In an embodiment, component 504 compares the received commands to the set of command options of the device specific code. In an embodiment, component 504 determines an unauthorized attempt to access the device occurred based on the analysis. For example, component 504 determines an unauthorized attempt to access the device occurred if the received commands do not match any of the set of command options of the device specific code. In another embodiment, component 504 determines an unauthorized attempt to access the device occurred if the same command is received at the device a predetermined number of times.

Component 506 transmits a security alert in response to determining an unauthorized attempt to access the device may have occurred. For example, component 506 transmits a security alert to the server 104. Component 506 may also display a security alert on the device to inform the user an unauthorized attempt to access the device may have occurred.

Component 508 switches the device to manual mode operation. For example, component 508 prevents access to internet on the device when in manual mode operation. Component 510 requests a new device specific code for use of the device in the IoT environment. For example, the device specific code may provide command options to be performed by the device.

Component 512 requests a new action map for the device. For example, the action map may provide a flowchart of steps to be performed upon selecting at least one of the command options. Component 514 requests a security policy update for the device. For example, the request is transmitted to the IoT security manager in communication with server 104.

Figure 6:
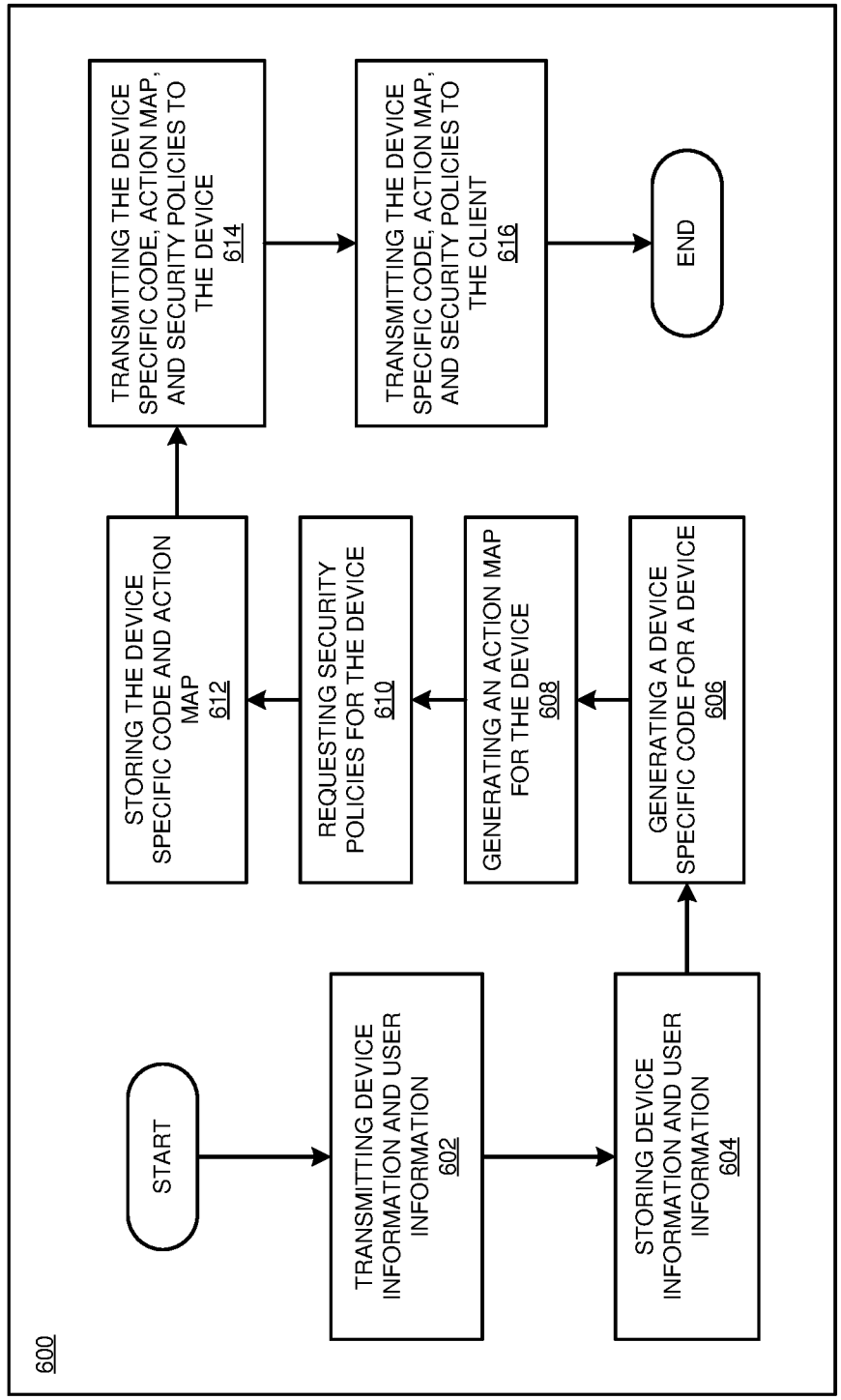
FIG. 6 depicts a flowchart of an example process for providing device specific security measures in an IoT environment in accordance with an illustrative embodiment.

With reference to FIG. 6, this figure depicts a flowchart of an example process 600 for providing device specific security measures in an IoT environment in accordance with an illustrative embodiment. Process 600 can be implemented in application 105, application 134, application 138, or distributed in separate applications within the scope of the illustrative embodiments.

In block 602, a device, such as device 132, transmits a set of device information and a set of user information. The transmitted information may be directed to application 105, detected by application 105, intercepted by application 105, or redirected to application 105. In block 604, application 105 stores the received device information and user information, for example, within storage unit 108.

In block 606, application 105 generates a device specific code for use of the device in the IoT environment. For example, the device specific code may provide command options to be performed by the device. In block 608, application 105 generates an action map for the device. For example, the action map may provide a flowchart of steps to be performed upon selecting at least one of the command options. In block 610, application 105 requests security policies for the device. In block 612, application 105 stores the device specific code and action map, for example, within storage unit 108. In block 614, application 105 transmits the generated device specific code, generated action map, and requested security policies to the device. In block 616, application 105 transmits the generated device specific code, generated action map, and security policies to a client, such as client 110 in FIG. 1. Application 105 ends process 600 thereafter.

Figure 7:
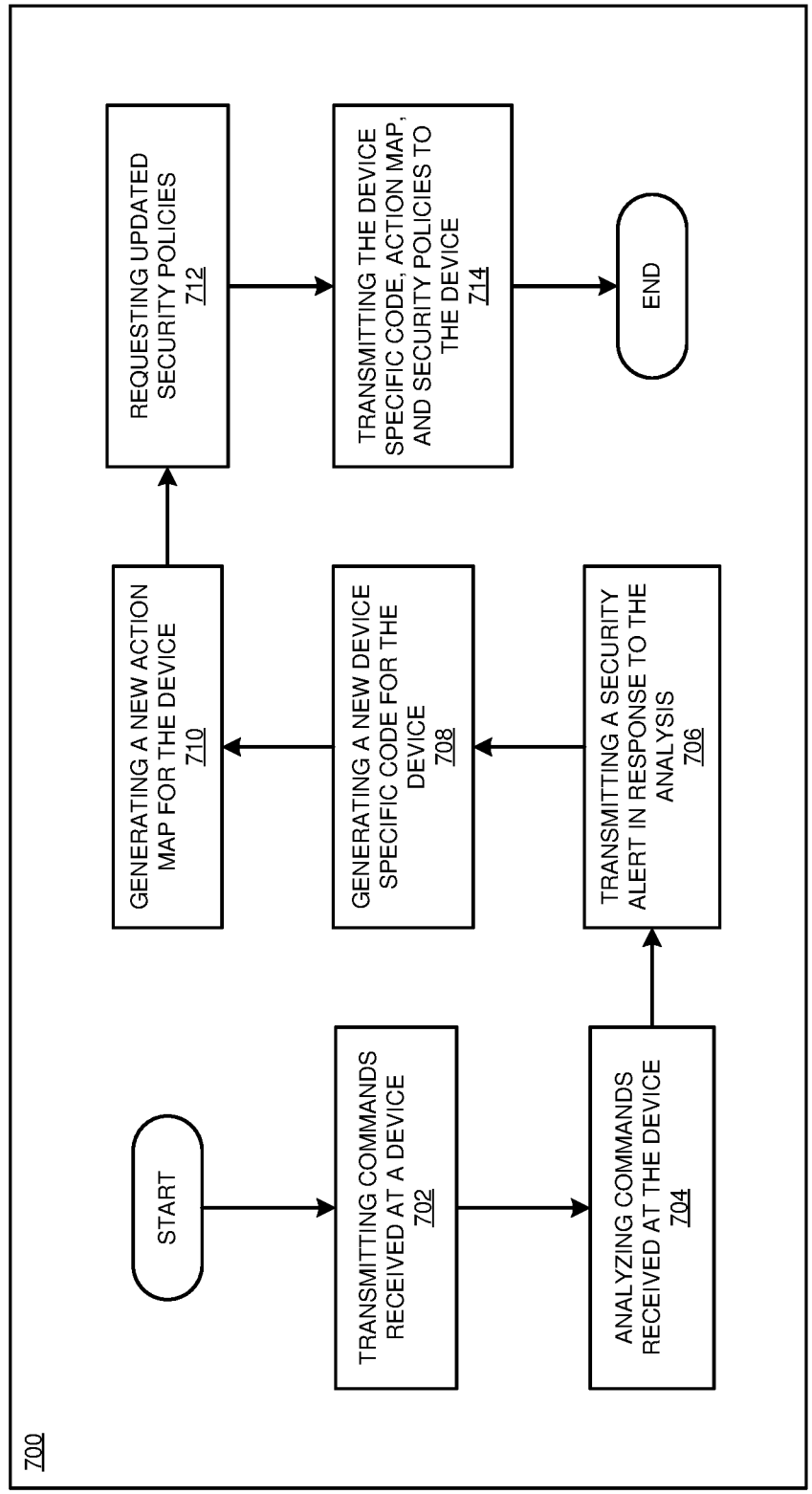
FIG. 7 depicts a flowchart of an example process for updating device specific security measures in an IoT environment in accordance with an illustrative embodiment.

With reference to FIG. 7, this figure depicts a flowchart of an example process 700 for updating device specific security measures in an IoT environment in accordance with an illustrative embodiment. Process 700 can be implemented in application 105, application 134, or distributed in separate applications within the scope of the illustrative embodiments.

In block 702, application 134 transmits commands received at a device, such as device 132. For example, if the device receives unidentifiable commands or commands which do not correspond to a service provided by the device, then application 134 transmits the commands to application 105. In block 704, application 105 analyzes commands received at the device. For example, if the device receives unidentifiable commands or commands which do not correspond to a service provided by the device, then application 105 analyzes the commands for an unauthorized attempt to access the device. For example, the device may be a printer and receive a command requesting available financial information, such as credit card data. In an embodiment, application 105 compares the received commands to the set of command options of the device specific code. In an embodiment, application 105 determines an unauthorized attempt to access the device occurred based on the analysis. For example, application 105 determines an unauthorized attempt to access the device occurred if the received commands do not match any of the set of command options of the device specific code. In another embodiment, application 105 determines an unauthorized attempt to access the device occurred if the same command is received at the device a predetermined number of times.

In block 706, application 105 transmits a security alert in response to the analysis determining an unauthorized attempt to access the device may have occurred. For example, application 105 transmits a security alert to the device 132. Application 134 may display a security alert on the device to inform the user an unauthorized attempt to access the device occurred in response to receiving the security alert from application 105. In block 708, application 105 generates a new device specific code for use of the device in the IoT environment. For example, the device specific code may provide command options to be performed by the device.

In block 710, application 105 generates a new action map for the device. For example, the action map may provide a flowchart of steps to be performed upon selecting at least one of the command options. In block 712, application 105 requests a security policy update for the device. For example, the request is transmitted to the IoT security manager in communication with server 104. In block 714, application 105 transmits the new device specific code, the new action map, and the updated security policy to the device 132. Application 105 ends process 700 thereafter.

Figure 8:
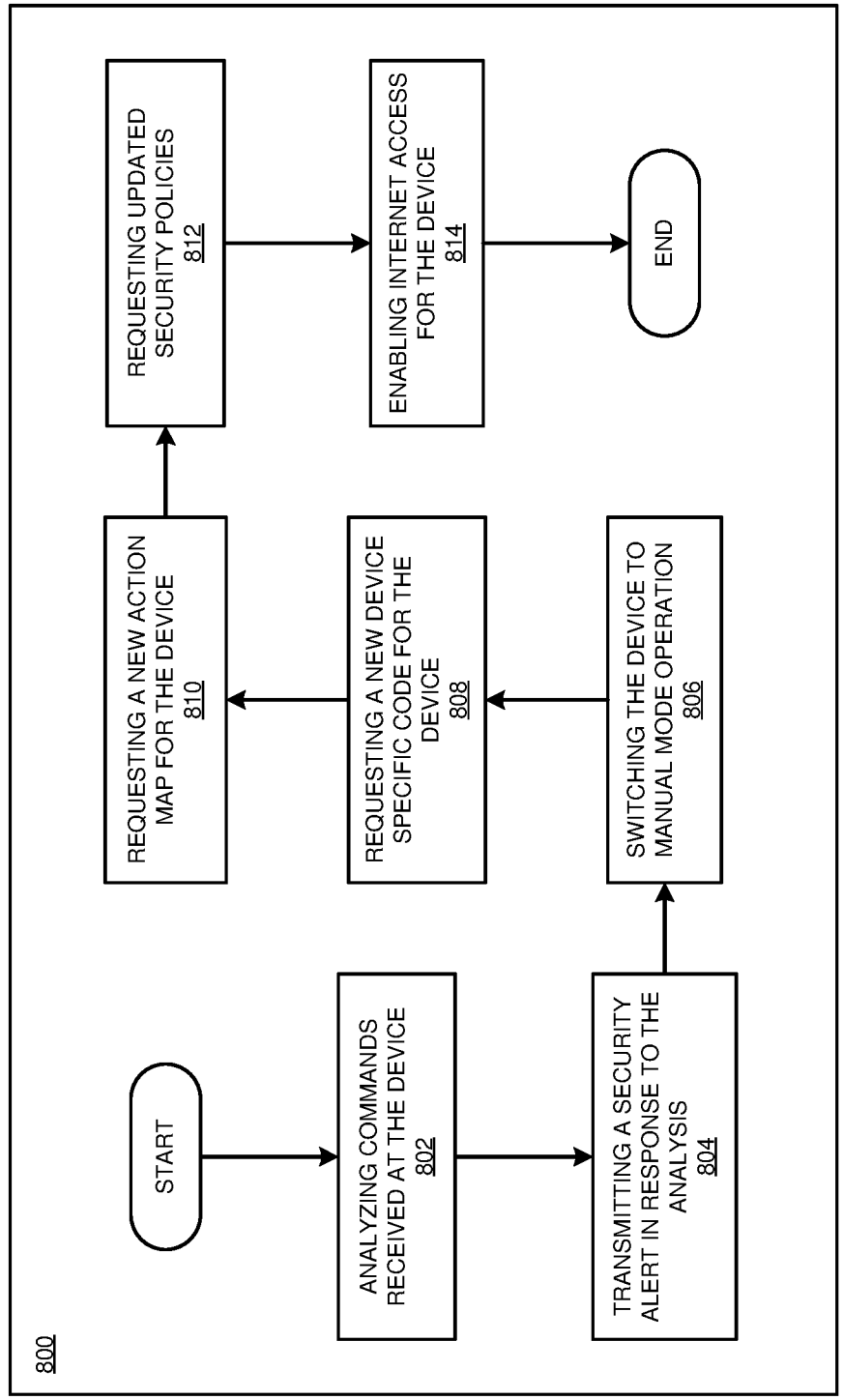
FIG. 8 depicts a flowchart of an example process for updating device specific security measures in an IoT environment in accordance with an illustrative embodiment.

With reference to FIG. 8, this figure depicts a flowchart of an example process 800 for updating device specific security measures in an IoT environment in accordance with an illustrative embodiment. Process 800 can be implemented in application 105, application 134, or distributed in separate applications within the scope of the illustrative embodiments.

In block 802, application 134 analyzes commands received at a device, such as device 132. For example, if the device receives unidentifiable commands or commands which do not correspond to a service provided by the device, then application 134 analyzes the commands for an unauthorized attempt to access the device. For example, the device may receive commands which do not correspond to any function capable of performance by the device. For example, the device may be a printer and receive a command requesting available financial information, such as credit card data. In an embodiment, application 134 compares the received commands to the set of command options of the device specific code. In an embodiment, application 134 determines an unauthorized attempt to access the device occurred based on the analysis. For example, application 134 determines an unauthorized attempt to access the device occurred if the received commands do not match any of the set of command options of the device specific code. In another embodiment, application 134 determines an unauthorized attempt to access the device occurred if the same command is received at the device a predetermined number of times.

In block 804, application 134 transmits a security alert in response to the analysis determining an unauthorized attempt to access the device may have occurred. For example, application 134 transmits a security alert to the server 104. Application 134 may also display a security alert on the device to inform the user an unauthorized attempt to access the device occurred. In block 806, application 134 switches the device to manual mode operation. For example, application 134 prevents access to internet on the device when in manual mode operation. In block 808, application 134 requests a new device specific code for use of the device in the IoT environment. For example, the device specific code may provide command options to be performed by the device.

In block 810, application 134 requests a new action map for the device. For example, the action map may provide a flowchart of steps to be performed upon selecting at least one of the command options. In block 812, application 134 requests a security policy update for the device. For example, the request is transmitted to the IoT security manager in communication with server 104. In block 814, after receiving the new device specific code, the new action map, and the updated security policies, application 134 enables internet access for the device. Application 134 ends process 800 thereafter.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for providing device specific security measures in an Internet of Things (IoT) environment, the method comprising:
   analyzing a first set of commands received at an IoT device (device) for an unauthorized attempt to gain access to the device;
   generating, for the device, a first device specific code, the first device specific code corresponding to a first set of command options to be performed by the device;
   generating, for the device, a first action map, the first action map corresponding to a first flowchart of steps to be performed upon selection of at least one of the command options; and
   transmitting, to the device, the first device specific code and the first action map.

2. The method of claim 1, further comprising:
   comparing the first set of commands received at the device to the first set of command options of the first device specific code.

3. The method of claim 1, further comprising:
   analyzing, at the device, a second set of commands received at the device for an unauthorized attempt to gain access to the device; and
   comparing the second set of commands received at the device to the first set of command options of the first device specific code.

4. The method of claim 3, further comprising:
   generating, for the device, a second device specific code, the second device specific code corresponding to a second set of command options to be performed by the device.

5. The method of claim 3, further comprising:
   generating, for the device, a second action map corresponding to a second flowchart of steps to be performed upon selection of at least one of the command options of the second set of command options of the second device specific code.

6. The method of claim 1, further comprising:
   transmitting, after analyzing the first set of commands received at the device, a security alert in response to the analysis.

7. The method of claim 3, further comprising:
   switching, after analyzing the second set of commands received at the device, the device to a manual mode operation, wherein the manual mode operation restricts internet access for the device.

8. The method of claim 6, further comprising:
   generating, based on the analysis of the second set of commands, a second device specific code, the second device specific code corresponding to a second set of command options to be performed by the device;
   generating, based on the analysis of the second set of commands, a second action map corresponding to a second flowchart of steps to be performed upon selection of at least one of the command options of the second set of command options of the second device specific code; and
   enabling, after generating the second device specific code and the second action map, internet access for the device.

9. The method of claim 1, further comprising:
   requesting, after generating the first device specific code and the first action map, a set of security policies for the device.

10. The method of claim 1, wherein the method is embodied in a computer program product comprising one or more computer-readable storage devices and computer-readable program instructions which are stored on the one or more computer-readable tangible storage devices and executed by one or more processors.

11. A computer usable program product for providing device specific security measures in an Internet of Things (IoT) environment, the computer program product comprising a computer-readable storage device, and program instructions stored on the storage device, the stored program instructions when executed by a processor causing a set of operations to be performed, the set of operations comprising:
   analyzing a first set of commands received at an IoT device (device) for an unauthorized attempt to gain access to the device;
   generating, for the device, a first device specific code, the first device specific code corresponding to a first set of command options to be performed by the device;
   generating, for the device, a first action map, the first action map corresponding to a first flowchart of steps to be performed upon selection of at least one of the command options; and
   transmitting, to the device, the first device specific code and the first action map.

12. The computer usable program product of claim 11, the stored program instructions further comprising:

comparing the first set of commands received at the device to the first set of command options of the first device specific code.

13. The computer usable program product of claim 11, the stored program instructions further comprising:
analyzing, at the device, a second set of commands received at the device for an unauthorized attempt to gain access to the device; and
comparing the second set of commands received at the device to the first set of command options of the first device specific code.

14. The computer usable program product of claim 13, the stored program instructions further comprising:
generating, for the device, a second device specific code, the second device specific code corresponding to a second set of command options to be performed by the device.

15. The computer usable program product of claim 13, the stored program instructions further comprising:
generating, for the device, a second action map corresponding to a second flowchart of steps to be performed upon selection of at least one of the command options of the second set of command options of the second device specific code.

16. The computer usable program product of claim 11, the stored program instructions further comprising:
transmitting, after analyzing the first set of commands received at the device, a security alert in response to the analysis.

17. The computer usable program product of claim 13, the stored program instructions further comprising:
switching, after analyzing the second set of commands received at the device, the device to a manual mode operation, wherein the manual mode operation restricts internet access for the device.

18. The computer usable program product of claim 11, wherein the stored program instructions are stored in a computer readable storage device in a data processing system, and wherein the stored program instructions are transferred over a network from a remote data processing system.

19. The computer usable program product of claim 11, wherein the stored program instructions are stored in a computer readable storage device in a server data processing system, and wherein the stored program instructions are downloaded over a network to a remote data processing system for use in a computer readable storage device associated with the remote data processing system.

20. A computer system for providing device specific security measures in an Internet of Things (IoT) environment, the computer system comprising a processor, a computer-readable memory, and a computer-readable storage device, and program instructions stored on the storage device for execution by the processor via the memory, the stored program instructions when executed by the processor causing a set of operations to be performed, the set of operations comprising:
analyzing a first set of commands received at an IoT device (device) for an unauthorized attempt to gain access to the device;
generating, for the device, a first device specific code, the first device specific code corresponding to a first set of command options to be performed by the device;
generating, for the device, a first action map, the first action map corresponding to a first flowchart of steps to be performed upon selection of at least one of the command options; and
transmitting, to the device, the first device specific code and the first action map.

* * * * *